United States Patent
Böer et al.

(10) Patent No.: US 7,428,479 B2
(45) Date of Patent: Sep. 23, 2008

(54) METHOD FOR COMPUTER MODELING THE CORE OF A NUCLEAR REACTOR

(75) Inventors: Rainer Böer, Schwarzenbrück (DE); Lothar Hetzelt, Erlangen (DE); Horst-Dieter Kiehlmann, Forchheim (DE); Hans-Joachim Winter, Erlangen (DE)

(73) Assignee: Areva NP GmbH, Erlangen (DE)

( * ) Notice: Subject to any disclaimer, the term of this patent is extended or adjusted under 35 U.S.C. 154(b) by 209 days.

(21) Appl. No.: 11/319,000

(22) Filed: Dec. 27, 2005

(65) Prior Publication Data

US 2006/0184286 A1   Aug. 17, 2006

Related U.S. Application Data

(63) Continuation of application No. PCT/EP2004/006955, filed on Jun. 26, 2004.

(30) Foreign Application Priority Data

Jun. 26, 2003 (DE) ............................... 103 28 920

(51) Int. Cl.
 *G06F 17/10* (2006.01)
 *G06G 7/48* (2006.01)
(52) U.S. Cl. ............................................. 703/2; 703/6
(58) Field of Classification Search ................ 703/2, 703/6
 See application file for complete search history.

(56) References Cited

U.S. PATENT DOCUMENTS 5,171,516 A   12/1992   Iwamoto (Continued)

FOREIGN PATENT DOCUMENTS

EP   102 394 80   11/1998

(Continued)

OTHER PUBLICATIONS

Suslov: Improvements In The Long Characteristics Method and Their Efficiency for Deep Penetration Calculations; Progress in Nuclear Energy, vol. 39, No. 2, pp. 223-242, 2001.*

(Continued)

*Primary Examiner*—Hugh Jones
(74) *Attorney, Agent, or Firm*—Laurence A. Greenberg; Werner H. Stemer; Ralph E. Locher

(57) ABSTRACT

In a computer modeling method for the core of a nuclear reactor the core is divided into a plurality of primary grids in the form of coarse mesh cells. A sub-section of the core relating to at least one grid is assigned to that grid. The sub-section includes that grid and a buffer zone that surrounds the grid horizontally and contains at least the grid that lies immediately adjacent to the first grid. The sub-section is sub-divided into a plurality of secondary grids—fine mesh cells—that are smaller than the primary grids. In a first computing step, a model of the core is calculated using a nodal calculation method, based on a respective dataset that is assigned to each primary grid. In a second computing step, a respective second dataset is assigned to each secondary grid of a sub-section and a model is then calculated for the sub-section, based on the dataset and the flows on the border of the sub-section that have been calculated in the first computing step.

10 Claims, 1 Drawing Sheet

U.S. PATENT DOCUMENTS 5,638,413 A    6/1997    Uematsu

FOREIGN PATENT DOCUMENTS

FR    2 833 400    6/2003
JP    2001 133 581 A    5/2001

OTHER PUBLICATIONS

Jevremovic et al.: Anemona: multiassembly neutron transport modeling; Annals of Nuclear Energy 29 (2002) 2105-2125.*

Scope 2:Object-Oriented Parallel Code for Multi-Group Diffusion/Transport Calculations in Three-Dimensional Fine-Mesh Reactor Core Geometry Masahiro Tatsumi and Akio Yamamoto—Physor 2002, Seoul, Korea Oct. 7-10, 2002.

* cited by examiner

METHOD FOR COMPUTER MODELING THE CORE OF A NUCLEAR REACTOR

CROSS-REFERENCE TO RELATED APPLICATION

This is a continuing application, under 35 U.S.C. § 120, of copending international application No. PCT/EP2004/006955, filed Jun. 26, 2004, which designated the United States; this application also claims the priority, under 35 U.S.C. § 119, of German patent application No. 103 28 920.8, filed Jun. 26, 2003; the prior applications are herewith incorporated by reference in their entirety.

BACKGROUND OF THE INVENTION

Field of the Invention

The invention relates to a method for computer modeling the core of a nuclear reactor. In order to design the core of a nuclear reactor economically, while at the same time maintaining sufficient safety margins, it is necessary to computationally model its neutron-physical and thermohydraulic properties as accurately as possible. Owing to the complexity of the processes which take place in the core as well as the heterogeneity of its structural layout, closed-form solutions of the equations describing the physical properties of the core are not possible, so that it is necessary to employ approximate numerical methods.

Nodal calculation methods, the fundamentals of which are explained in detail by H. Finnemann et al., *Interface Current Techniques For Multidimensional Reactor Calculations*, Atomkernenergie, Vol. 30, 1977, p. 123-28 ; and Finnemann and Gundlach, *Space-Time Kinetics Code IQSBOX for PWR and BWR*, Atomkernenergie—Kerntechnik, Vol. 37, 1981, for example, are known methods for computer modeling a reactor. In these calculation methods, the core is divided into a coarse-mesh grid with a multiplicity of square mesh cells (or boxes). For many applications, the horizontal mesh cell size corresponds to one fuel element or one fourth of a fuel element (coarse mesh cell). A fuel element is then represented by a multiplicity of mesh cells arranged above one another vertically, i.e. in the direction of the fuel element axis. In this way, a number of mesh cells corresponding to the number of fuel elements is formed in the horizontal plane. The mesh cells are also referred to as nodes in neutron-physical modeling, and as channels in thermohydraulic modeling. Each mesh cell is spatially coupled to the neighboring mesh cells at their interfaces via corresponding integral fluxes (i.e. averaged over the respective interface), for example heat flux or neutron flux. Each mesh cell is characterized by a dataset which reflects its average properties in a homogenized representation, for example macroscopic nodal (effective) cross sections or flow resistance coefficients. This dataset is calculated in upstream computational methods for the modeled structural conditions prevailing in the mesh cell (geometrical structure, fuel and moderator distribution, water tubes or structure tubes which may be present, etc.) under idealized boundary conditions (for neutron-physical modeling, these are generally symmetric boundary conditions in which the respective flux out of the mesh cell is identical to the flux directed into the mesh cell) as a fine mesh, for example pin-by-pin (at the pin level) i.e. with mesh cells which respectively contain only one structural element (fuel rod, control rod, etc.) of the fuel element, for example with the aid of a spectral code for neutronics.

In the scope of the coarse-mesh nodal calculation, in order to obtain more accurate information about the fine structure of the neutron-physical and thermohydraulic situation within a coarse mesh cell, i.e. at the pin level, the coarse-mesh physical state variables respectively calculated for a mesh cell, for example the neutron flux, furthermore have to be modulated with a form function resulting from the aforementioned idealized pin-by-pin calculation of a mesh cell.

In order to model the reactor, the neutron-physical and thermohydraulic calculation methods (codes) are coupled. For boiling water reactors, for example, such coupling is implemented in the IQSBWR code as explained in detail by Finnemann and Gundlach, supra. For pressurized water reactors, R. Boer et al., *The Code System PANBOX for PWR Safety Analysis*, Kerntechnik 57, 1992, No.1 discloses the coupled program system PANBOX.

The desire for maximally efficient utilization of the nuclear fuel leads to fueling strategies which entail pronounced heterogeneous axial and radial power distributions. Furthermore, optimum design of the fuel rods of fuel elements (for example axial and radial enrichment gradings, inhomogeneities due to structural inserts to improve the mixing (in PWR and BWR), the use of sub-length rods to avoid dry-out in BWR) also entails a pronounced heterogeneity within the fuel elements. In order to permit maximally efficient utilization of the nuclear fuel, while maintaining sufficient safety margins, greater and greater requirements are being placed on the numerical methods of core simulators. The aforementioned coarse-mesh nodal calculation methods suffer from accuracy limitations under such conditions.

It is in principle possible to perform fine-mesh modeling, in particular pin-by-pin, for the entire core. For example, such a method is explained by M. Tatsumi, A. Yamamoto, *Scope 2: Object-Oriented Parallel Code For Multi-Group Diffusion/Transport Calculations In Three-Dimensional Fine-Mesh Reactor Core Geometry*, PHYSOR 2002, Seoul, Korea, Oct. 7-10, 2002 for neutron-physical modeling. There, the coarse-mesh nodal calculation method is applied to the pin level, i.e. the mesh cells are reduced to pin size. It is then possible to leave the calculation algorithms fundamentally unmodified, and merely increase the number of mesh cells.

A typical model which is currently used in practice for a pressurized water reactor with 193 fuel elements, for example, in which the core is divided into 193*4 mesh cells in the horizontal plane (4 mesh cells per fuel element) and in which a two-energy group model is employed for the neutronics, 15 axial layers are used for the neutron-physical modeling and 40 axial layers are used for the thermohydraulic modeling, leads to a total number of 2*4*15*193 (neutronics) +4*40*193 (thermohydraulics)$\approx$50*10$^3$ computation mesh cells.

For pin-based modeling, in addition to increasing the number of spatial mesh cells in the horizontal plane to 18*18 pins (=fuel or control rods) per fuel element, it is also necessary to increase the number of axial layers to approximately 100 both for the neutronics and for the thermohydraulics. In order to improve the accuracy, it is furthermore necessary to increase the number of energy groups considered. If the neutrons are divided into 15 energy groups, for example, this leads to a total number of about 15*324*100*193+324*100*193$\approx$1*10$^8$ computation mesh cells. This increases the problem size of coupled neutronic-thermohydraulic nuclear calculations at the pin level by more than 3 orders of magnitude, compared with the code currently used in practice. Owing to the concomitant high computation outlay, the pin-by-pin models known according to the current state of the art are not suitable for standardized assistance in nuclear design.

SUMMARY OF THE INVENTION

It is accordingly an object of the invention to provide a method for computational modeling of the core of a nuclear reactor which overcomes the above-mentioned disadvantages of the heretofore-known devices and methods of this general type and which provides for a method of pin-based computer modeling of the core of a nuclear reactor, which permits sufficiently accurate results with an outlay tolerable for nuclear design.

With the foregoing and other objects in view there is provided, in accordance with the invention, a method for computer modeling the core of a nuclear reactor, comprising the following method steps:

dividing the core into a multiplicity of coarse mesh cells including at least one given coarse mesh cell and adjoining coarse mesh cells;

assigning the at least one given coarse mesh cell a subregion of the core, the subregion containing the given coarse mesh cell and a buffer zone, the buffer zone enclosing the given coarse mesh cell in a horizontal direction and containing at least the coarse mesh cells immediately adjoining the coarse mesh cell;

dividing the subregion into a multiplicity of fine mesh cells, the fine mesh cells being finer than the coarse mesh cells;

assigning a first dataset to each coarse mesh cell and, based on the dataset respectively assigned to each coarse mesh cell, calculating a model of the core by a nodal calculation method in a first computation step;

assigning a second dataset to each fine mesh cell and, based on the second dataset respectively assigned to each fine mesh cell of a subregion and with fluxes at a boundary of the subregion as calculated in the first computation step, calculating a model for the subregion by a nodal calculation method in a second computation step.

In other words, the objects of the invention are achieved in that the core is first divided into a multiplicity of coarse mesh cells or primary grids. At least one coarse mesh cell is assigned a subregion of the core which contains it, this subregion comprising this coarse mesh cell and a buffer zone, which encloses it in the horizontal direction and contains at least the coarse mesh cells immediately next to this coarse mesh cell. This subregion is in turn subdivided into a multiplicity of fine mesh cells, which are finer than the coarse mesh cells. On the basis of the dataset respectively assigned to each coarse mesh cell, a model of the core is then calculated by a nodal calculation method in a first computation step. On the basis of the second dataset respectively assigned to each fine mesh cell of a subregion and with the fluxes at the boundary of this subregion as calculated in the first computation step, a model for this subregion is subsequently calculated by a nodal calculation method in a second computation step.

In other words: average fluxes for each side face are calculated in a first step for all the coarse mesh cells of the core on the basis of the datasets respectively specified for these coarse mesh cells, for example as presented by Wagner, Koebke, and Winter, *A Nonlinear Extension Of The Nodal Expansion Method*, Proc. ANS/ENS Int'l. Topical Mtg., Munich, FRG, 2, p. 43, Apr. 1981. Fine-mesh calculations are carried out in a second step for a subregion of the core which covers a selected coarse mesh cell, with the aid of predetermined datasets assigned to the fine mesh cells. The outer boundary conditions of the subregion are in this case obtained from the average fluxes as determined in the first step. In other words: instead of a fine-mesh analysis of the entire core, it is initially modeled as a coarse mesh. This coarse-mesh modeling then provides the boundary conditions (input conditions) for a selected subregion of the core, which is modeled as a fine mesh with these boundary conditions. In order to model the entire core, it is thus decomposed into overlapping subregions that cover the respectively considered coarse mesh cells which, for example, are geometrically formed by a one fuel element. The subregions can be modeled independently of one another as a fine mesh, since the boundary conditions and datasets needed for their modeling are known.

The decomposition of the fine-mesh calculation of the entire core into a number, corresponding to the number of subregions, of sub-problems calculable independently of one another as fine meshes which can be processed in parallel with one another, for example by a PC cluster system having a number of parallel processors corresponding to this number, is an essential advantage of the method according to the invention.

Another advantage of this solution approach is that it can be restricted to the subregions of the core which are particularly critical for the accuracy of the solution, and the calculation can also be carried out with a higher-quality model.

In the present application, the term "mesh cell" is intended to mean either a node (for the neutron-physical modeling) or a channel (for the thermohydraulic modeling). The underlying idea of the invention can be applied both to the neutron-physical modeling and to the thermohydraulic modeling.

In a preferred embodiment of the method, the buffer zone around the coarse mesh cell in question consists of the coarse mesh cells which are immediately next to this coarse mesh cell and intact with it. In other words: the width of the buffer zone around the coarse mesh cell in question corresponds to the width of a coarse mesh cell. The invention is in this case based on the idea that for fine-mesh modeling of a core, which is preferably carried out at the pin level i.e. with fine mesh cells respectively defined by a pin, it is sufficient merely for the coarse mesh cells neighboring a coarse mesh cell and interacting with it to be subjected to fine-mesh modeling, preferably pin-by-pin, since the extent of the interaction between the coarse mesh cells decreases with the distance between them. In other words: coarse mesh cells spaced far apart perceive each other only in terms of their "averaged" properties. The fine structures found within a coarse mesh cell in a pin-by-pin calculation then have only a comparatively negligible effect in the analysis of a coarse mesh cell far away from it.

If the coarse mesh cell in a horizontal cross-sectional plane is formed by a complete fuel element then a preferred subregion, i.e. when only the immediately neighboring coarse mesh cells are included, is a 3×3 fuel element arrangement. In pressurized water reactors, the subregion then comprises 9 coarse mesh cells (nodes or channels) both for the neutronics and for the thermohydraulics.

The situation in boiling water reactors is different since the fuel elements in them have a casing, so that the thermohydraulic interaction between horizontal coarse mesh cells, which are referred to as channels in this case, is limited to the mesh cells or channels which lie inside the fuel element. This makes it possible to divide the thermohydraulic 3×3 problem into 9 independent sub-problems.

Admittedly, based on the numerical example explained in the introduction, the computation scope of the pin-by-pin calculation will initially be increased by the factor 9 from $1*10^8$ to $(1+15)*324*100*193*9 \approx 9*10^8$. This increase, however, is compensated for by the now possible decomposition of the overall problem into 193 independent sub-problems to be calculated in parallel, whose problem size is accordingly about a factor of 20 less and therefore easier to control in many regards than the core-wide pin approach. Moreover, the total computation outlay for all the sub-problems is actually reduced, compared with the computational outlay of the overall problem, if the computation outlay of the solution algorithm used increases e.g. more than quadratically with the problem size.

When using a coarse-mesh nodal method for pressurized water reactors, in which the fuel element is divided into four coarse mesh cells (nodes or channels) in the horizontal plane both for the neutronics and for the thermohydraulics, the relevant subregion in a horizontal plane comprises 16 coarse mesh cells (nodes or channels), 4 of which form the fuel element in question which is surrounded by a buffer zone of 12 coarse mesh cells (nodes or channels) whose width corresponds to half the width of the fuel element.

In a particularly preferred refinement of the method, the second computation step is carried out several times together with the first computation step, each repeated execution of the second computation step using the fluxes at the boundary of the subregion as calculated for the respective subregions in the preceding first computation step, while the nodal datasets for the subsequent first computation step are determined from the second computation step. On the one hand, this increases the accuracy of the resulting nodal core model, and on the other hand the convergence of the iteratively obtained solutions also serves as an indicator of the reliability of the method.

Other features which are considered as characteristic for the invention are set forth in the appended claims.

Although the invention is illustrated and described herein as embodied in a computer modeling method for the core of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
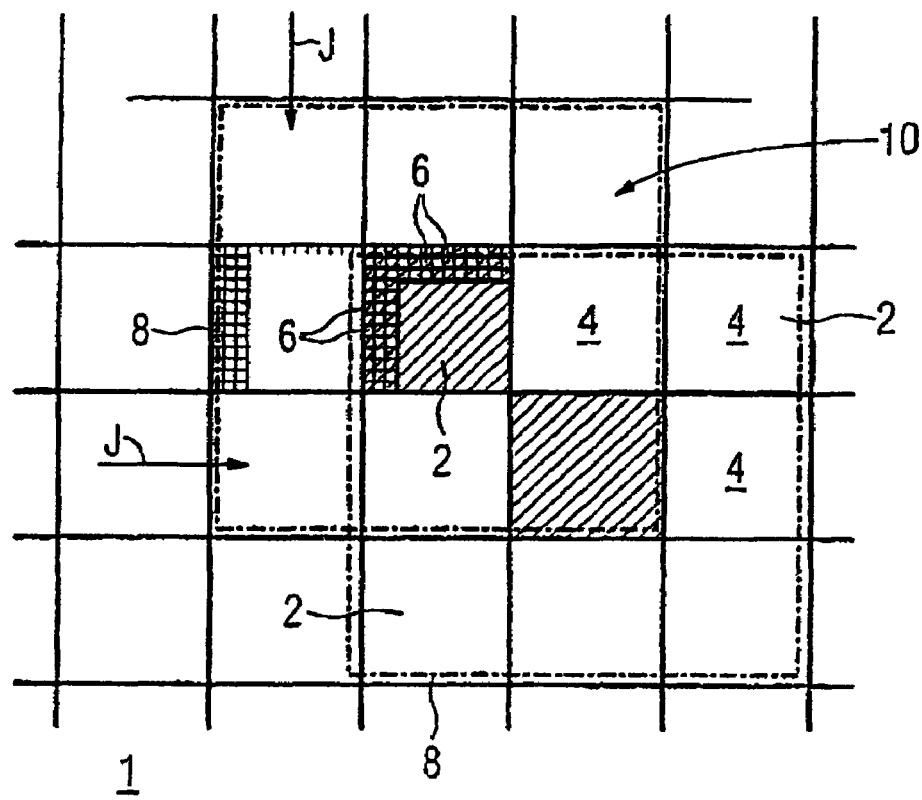
FIG. 1 is a diagrammatic detail of core grid, wherein a node forms a horizontal layer of a complete fuel element.

Referring now to the figures of the drawing in detail and first, particularly, to FIG. 1 thereof, there is shown a core 1 of a nuclear reactor to be modeled according to the invention. The core 1 is divided into a multiplicity of coarse mesh cells 2 (nodes or channels) which, in the exemplary embodiment, are respectively formed by a section (layer) extending in the axial direction (perpendicularly to the plane of the drawing) of a complete fuel element 4, there being 100 such sections in the exemplary embodiment. The parameters needed for characterizing the physical properties of the core 1 are determined on the basis of such a division which covers the entire core, for example by a nodal multigroup method, e.g. an NEM method (/1/), for the neutron-physical modeling. In the exemplary embodiment presented, which is suitable in particular for modeling a pressurized water reactor core, the coarse mesh cells 2 (channels) used for the thermohydraulic calculation are the same as the coarse mesh cells 2 (nodes) used for the neutron-physical modeling. This is not absolutely necessary, however. Instead, the coarse mesh cells 2 for the neutron-physical and thermohydraulic calculations may also be split up differently. In a boiling water reactor, for instance, it is necessary to use 3 channels in a horizontal layer for the thermohydraulic representation of a fuel element.

Each coarse mesh cell 2 contains a multiplicity of fine mesh cells 6 which are preferably pins, i.e. elements inside a fuel element, for example fuel rods, control rods, control rod guide tubes, or water tubes etc., which may be combined as a subunit in a physically expedient way.

Each coarse mesh cell 2 is assigned a subregion 8 of the core 1 which contains it, this subregion 8 comprising this coarse mesh cell 2 and a buffer zone 10, which encloses it in the horizontal direction and contains at least the coarse mesh cells 2 immediately next to this coarse mesh cell 2. In the exemplary embodiment, this buffer zone 10 is formed by the mesh cells immediately next to the mesh cell 2 lying on the inside, and therefore corresponds to the width of a fuel element.

This subregion 8 is subdivided by a multiplicity of fine mesh cells 6. This provides a number of mutually overlapping subregions 8 which corresponds to the number of coarse mesh cells 2. In other words: the core 1 is divided into a number of overlapping subregions 8 corresponding to the number of fuel elements 4.

As explained in the introduction, each coarse mesh cell 2 is assigned a dataset on the basis of which a coarse-mesh neutron-physical and thermodynamic calculation of the entire core 1 is carried out in a first computation step with one of the nodal methods mentioned in the introduction, for example the codes known by the commercial name PANBOX with COBRA for a pressurized water reactor core or using the codes MICROBURN-B2 with COBRA for a boiling water reactor core, although any qualified nodal calculation method may in principle be used.

On the basis of the second dataset respectively assigned to each fine mesh cell 6 of a subregion 8 and with the integral fluxes J, i.e. average fluxes respectively relating to the entire coarse mesh cell 2, at the boundary of this subregion 8 as calculated in the first computation step, a model for this subregion 8 is subsequently calculated by a nodal calculation method in a second computation step. In this case, for example, the integral fluxes J respectively relating to an entire coarse mesh cell 2 may be distributed over the individual fine mesh cells 6 (pins) with a predetermined form function taking into account the specific situation of the respective coarse mesh cell 2.

The fine-mesh, in particular pin-by-pin calculation carried out in the second computation step then leads to an accurate solution for the coarse mesh cell 2 which lies in the middle of the subregion 8, and which is a section of a fuel element in the example. The buffer zone 10 formed around the fuel element, or the coarse mesh cell 2 lying on the inside, is in this case used to filter out the only approximately correct local boundary conditions due to the coarse-mesh nodal modeling.

The same splitting of the core 1 into the subregions 8 is also carried out in respect of the neutron-physical modeling for a boiling water reactor core. Conversely, however, owing to the lack of mass transport (no cross-exchange of water or steam)

between neighboring fuel elements, a horizontal buffer zone is unnecessary for the thermohydraulic fine-mesh or pin-by-pin calculation.

A reliable solution is achieved whenever local solutions at the fine-mesh level and a global solution at the coarse-mesh level converge during iteration between coarse and fine meshes.

Figure 2:
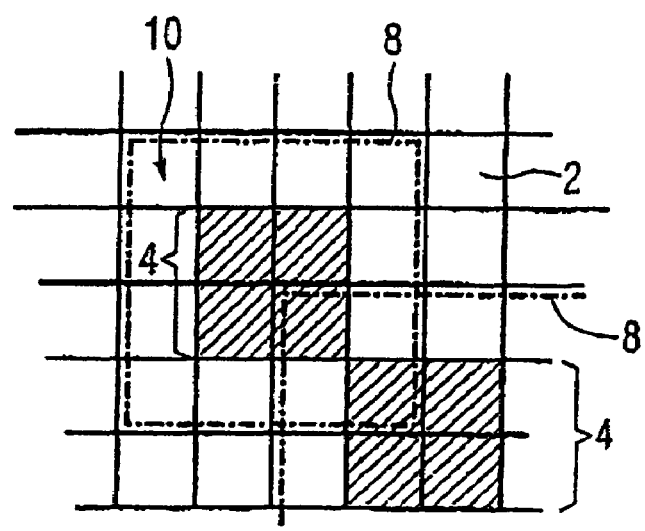
FIG. 2 shows a detail of a core, wherein a horizontal layer of a complete fuel element is formed by four nodes.

In the exemplary embodiment according to FIG. 2, for more accurate coarse-mesh nodal modeling of a pressurized water reactor, the fuel element 4 is divided into 4 coarse mesh cells 2 (respectively nodes and channels) for the neutronics and the thermohydraulics.

The subregion 8 in this exemplary embodiment likewise comprises only the coarse mesh cells 2 immediately next to the fuel element 4 lying in the middle, so that the width of the buffer zone 10 corresponds to half the width of a fuel element.

In more accurate coarse-mesh nodal modeling of a boiling water reactor, the allocation of one coarse mesh cell (node) per fuel element will generally be kept for the neutronics. Each fuel element is divided into three coarse mesh cells (channels) for the thermohydraulics, a horizontal buffer zone again being unnecessary.

The following literature sources are cited in the above description and, as far as necessary, their disclosures are herewith incorporated by reference:

[1] H. Finnemann et al., *Interface Current Techniques For Multidimensional Reactor Calculations*, Atomkernenergie, vol. 30, 1977, p. 123-28.
[2] Finnemann and Gundlach, *Space-Time Kinetics Code IQSBOX for PWR and BWR*, Atomkernenergie-Kerntechnik, Vol. 37, 1981.
[3] R. Boer et al., *The Code System PANBOX for PWR Safety Analysis*, Kerntechnik 57, 1992, No.1.
[4] M. Tatsumi, A. Yamamoto, *Scope 2: Object-Oriented Parallel Code For Multi-Group Diffusion/Transport Calculations In Three-Dimensional Fine-Mesh Reactor Core Geometry*, PHYSOR 2002, Seoul, Korea, Oct. 7-10, 2002.
[5] Wagner, Koebke, and Winter, *A Nonlinear Extension of The Nodal Expansion Method*, Proc. ANS/ENS Int'l. Topical Mtg., Munich, FRG, 2, p. 43, Apr. 1981.

We claim:

1. A method for computer modeling the core of a nuclear reactor, comprising the following method steps:
   dividing the core into a multiplicity of coarse mesh cells including at least one given coarse mesh cell and adjoining coarse mesh cells;
   assigning the at least one given coarse mesh cell a subregion of the core, the subregion having a boundary and containing the given coarse mesh cell and a buffer zone, the buffer zone enclosing the given coarse mesh cell in a horizontal direction and containing at least the coarse mesh cells immediately adjoining the coarse mesh cell;
   dividing the subregion into a multiplicity of fine mesh cells, the fine mesh cells being finer than the coarse mesh cells;
   assigning a first dataset to each coarse mesh cell and, based on the dataset respectively assigned to each coarse mesh cell, calculating a model of the core, including fluxes at the boundary of the subregion by a nodal calculation method in a first computation step;
   assigning a second dataset to each fine mesh cell and, based on the second dataset respectively assigned to each fine mesh cell of a subregion and with fluxes at the boundary of the subregion as calculated in the first computation step, calculating a model for the subregion by a nodal calculation method in a second computation step; and
   outputting the model of the core obtained in the first computation step and the model for the subregion obtained in the second computation step.

2. The method according to claim 1, which comprises carrying out the second computation step for all coarse mesh cells.

3. The method according to claim 2, which comprises carrying out the second computation step several times together with the first computation step, each repeated execution of the second computation step using the fluxes at the boundary of the subregion as calculated for the respective subregions in the preceding first computation step.

4. The method according to claim 1, which comprises defining the buffer zone around the given coarse mesh cell with the coarse mesh cells immediately next to the given coarse mesh cell and in functional exchange therewith.

5. The method according to claim 1, wherein the fine mesh cells are formed by pins.

6. The method according to claim 1, wherein a coarse mesh cell in a horizontal cross-sectional plane is formed by a complete fuel element.

7. The method according to claim 1, which comprises defining four coarse mesh cells per fuel element in a horizontal cross-sectional plane.

8. In a method of designing a core of a nuclear reactor, the improvement which comprises modeling the core with the method according to claim 1.

9. A nuclear simulator having a computer program installed therein for carrying out the method according to claim 1.

10. A computer-readable medium having computer-executable instructions stored thereon for executing the method according to claim 1 when the computer-executable instructions are loaded onto a computer.

* * * * *